United States Patent [19]

Rekers et al.

[11] Patent Number: 4,649,128

[45] Date of Patent: Mar. 10, 1987

[54] DEACTIVATOR FOR OLEFIN POLYMERIZATION CATALYST

[75] Inventors: Louis J. Rekers, Wyoming, Ohio; Anthony N. Speca, Kingwood, Tex.; Harry W. Mayhew, Cincinnati, Ohio

[73] Assignee: National Distillers and Chemical Corporation, New York, N.Y.

[21] Appl. No.: 800,233

[22] Filed: Nov. 21, 1985

[51] Int. Cl.$^4$ .......................... C08F 4/64; C08F 4/68; C08F 4/62

[52] U.S. Cl. .................. 502/109; 502/159; 526/142; 526/201; 526/203

[58] Field of Search .................. 502/109, 159

[56] References Cited

U.S. PATENT DOCUMENTS

| | | | |
|---|---|---|---|
| 3,396,155 | 8/1968 | Delbouille et al. | 502/109 X |
| 3,483,274 | 12/1969 | Bacskai | 502/109 X |
| 4,098,979 | 7/1978 | Maemoto et al. | 502/109 X |
| 4,182,811 | 1/1980 | Bocharov et al. | 502/109 X |
| 4,246,134 | 1/1981 | Uvarov et al. | 502/109 X |
| 4,389,334 | 6/1983 | Weinert et al. | 502/109 X |
| 4,465,783 | 8/1984 | McKenzie | 502/109 X |

FOREIGN PATENT DOCUMENTS 2451221  11/1980  France ............................ 502/109

Primary Examiner—Patrick P. Garvin
Attorney, Agent, or Firm—Kenneth D. Tremain

[57] ABSTRACT

A method is disclosed for controlling the activity of or deactivating a transition element olefin polymerization catalyst by contacting the catalyst with a deactivating polymer comprising a homopolymer of an unsaturated polar organic compound or a copolymer of an alpha-olefin and an unsaturated polar organic compound.

12 Claims, No Drawings

DEACTIVATOR FOR OLEFIN POLYMERIZATION CATALYST

DESCRIPTION

1. Technical Field

The present invention relates to a method for deactivating Ziegler-Natta or transition element oxide polymerization catalysts.

2. Prior Art

Various processes are known for deactivation of Ziegler-Natta catalysts such as described by Zboril in U.S. Pat. No. 4,430,488 who discloses a salt of an alkaline earth metal or zinc and an aliphatic monocarboxylic acid dissolved in a hydrocarbon solvent may be employed for this purpose.

Machon et al. similarly disclose in U.S. Pat. No. 4,105,609 that a Ziegler-Natta catalyst used for the preparation of polyethylene in a high temperature high pressure process can be deactivated at the end of the reaction by means of an alkali metal salt or alkaline earth metal salt of a carboxylic acid.

The deactivation of Ziegler-Natta catalysts is disclosed by Cupples et al. in U.S Pat. No. 3,876,600 in which flux-calcined diatomite is employed to deactivate and insolubilize the aluminum and titanium components of the catalyst after which the insolubilized aluminum and titanium are filtered from the polymer.

Dietrich et al. U.S. Pat. No. 3,708,465 describe a method for the deactivation of a Ziegler catalyst containing alkyl groups and hydride groups bonded to aluminum and a heavy metal component such as titanium by means of an alcohol which reacts with the alkyl and/or hydride groups before the heavy metal component.

Bacskai discloses in U.S. Pat. No. 3,520,866 that an alkanol solution of an alkali metal alkoxide can be employed to deactivate Ziegler-Natta catalysts employed for the polymerization of propylene in the presence of a hydrocarbon solvent.

SUMMARY OF THE INVENTION

The present invention relates to a method for controlling the activity of or deactivating an olefin polymerization catalyst, such as a Ziegler-Natta transition element catalyst or a transition element oxide olefin polymerization catalyst comprising contacting the catalyst with a deactivating polymer of an unsaturated polar organic compound i.e., a polymer comprising a homopolymer of an unsaturated polar organic compound or a copolymer of an alpha-olefin and an unsaturated polar organic compound.

The invention also relates to a method for the preparation of polyolefins at elevated pressures by polymerizing alpha-olefins in the presence of a Ziegler-Natta catalyst based on a transition element or a transition element oxide catalyst whereby the polyolefin contains the catalyst in an active state. The catalyst is deactivated or catalyst activity is controlled by contacting the polyolefin containing the catalyst in an active state with a deactivating polymer after the alpha-olefin has been polymerized. The deactivating polymer of an unsaturated polar organic compound comprises a homopolymer of an unsaturated polar organic compound or a copolymer of an alpha-olefin and an unsaturated polar organic compound such as an unsaturated ester and the like.

DETAILED DESCRIPTION OF THE INVENTION

Although Ziegler-Natta catalysts or olefin polymerization catalysts based on transition element oxides may be employed at ambient pressures and above (e.g., 1 to about 50 atmospheres) for the polymerization of alpha-olefins, catalysts of this type are also employed in high pressure processes such as in the production of linear low density polymers of alpha-olefins including polyethylene, polypropylene, polybutylene, copolymers thereof and the like. These processes are generally conducted at pressures from about 25 to about 35,000 psig and employ olefin polymerization conditions similar to those used prior to the discovery of the Ziegler-Natta catalysts.

In the high pressure processes employing these catalysts, the polymer obtained has to be processed through a "let-down" step in which the polymer is brought to ambient conditions of temperature and pressure and the residual alpha-olefin monomer, if any, is stripped from the polymer. The "let-down" procedure is employed in continuous, semi-continuous and batch polymerization processes. In the continuous and semi-continuous processes, the polymer obtained from the process is introduced into a let-down vessel by means of a conduit, after which residual monomer is removed from the polymer and returned to the polymerization process.

It is essential, prior to, or as part of, the let-down step, and especially in the continuous and semicontinuous processes where a let-down vessel is employed that any active catalyst remaining in the polymer be deactivated, otherwise there is a danger that further polymerization will take place and cause temperature and pressure rises. In any event, it is essential in order to control the molecular weight and molecular weight distribution of the polymer that the polymerization be terminated at as nearly a precise end point as possible in order to avoid production of polymers that are excessively high or low in molecular weight and contain a molecular weight distribution that is not desired in the end product.

The explosion hazards presented by the continued reaction of monomer during the let-down process in some instances can lead to line rupture and/or tank rupture and can therefore be extremely dangerous.

For these reasons, the prior art has employed deactivators for this type of catalyst, some of which have been described above. These deactivators in some instances contain inorganic materials which may not be desirable in the polymer produced and are removed along with the catalyst (of. U.S. Pat. No. 3,876,600).

In some prior art continuous or semi-continuous processes, a liquid deactivator is employed and is removed from the polymer along with unreacted alpha-olefin monomer. Prior to recycling the alpha-olefin monomer for subsequent polymerization, the liquid deactivator has to be removed, usually by a distillation or stripping process. If the separation is not efficient, the liquid deactivator is recycled back to the reactor along with unreacted alpha-olefin. The polymerization catalyst in the polymerization reactor is thereby deactivated by the recycle to some degree before the polymerization is completed.

Gas-phase polymerization of olefins is described in the U.S. Pat. Nos. to Dormenval et al., 3,922,322; Jezl et al., 3,965,083; Jezl et al., 3,970,611; Peters et al., 3,971,768; Miller, 4,003,712; Levine et al., 4,011,382;

and Jezl et al. 4,129,701, all of which are incorporated herein be reference.

The Standard Oil gas-phase process as described by Jezl et al. and Peters employs a horizontal stirred reactor having several compartments which form a bed. This bed has a series of longitudinally extending paddles that are rotated at a relatively low speed. The monomer such as ethylene or its equivalents, hydrogen (employed for molecular weight control) and a recycle gas stream are injected into the bottom of each one of the compartments. The injection velocity of these components is low enough so that the bed will not be fluidized. Several openings are provided along the top of the reactor through which a quench stream and catalyst components are injected. A relatively low molecular weight hydrocarbon such as isopentane or butane is employed as the quench stream and may optionally contain a liquid comonomer such as those described herein for the manufacture of LLD polymers.

It should be noted in this regard that the gas phase process allows for the production of LLD polymers at pressures considerably less than the approximate 10,000 psig to about 30,000 psig pressures employed in the so called high pressure process.

One of the difficulties with the gas-phase process is the high activity of the catalyst and the resultant problems with so called hot-spots. In the Standard Oil process, the problem of hot-spots is prevented by the quench stream which cools the reaction mass by evaporation. Without this cooling process, the reaction mass would be converted into molten polymer which would coat the walls of the reactor and plug the various inlet and polymer discharge orifices.

In the Standard Oil process, the series of paddles in the reactor keep the reaction mass agitated. This mass grows as a result of the polymerization reaction and is transported from one compartment to another and is finally discharged at the end of the reactor. Unreacted monomer and quench stream components are removed from the reaction mass, separated and recycled as separate streams to the reactor.

The Standard Oil process generally employs a highly active titanium catalyst on a support in combination with a triethyl aluminum cocatalyst.

The Naphtachimie and Union Carbide gas phase process are described in the aforementioned U.S. patent to Levine et al., Miller and Dormenvale. These processes differ from the Standard Oil process in that a vertical fluidized bed reactor is employed. Problems are also encountered due to the high activity of the catalyst which causes hot-spots and the formation of molten polymer in the reaction. If not controlled, the molten polymer not only coats out on the walls of the reactor but also tends to plug the various inlet and outlet openings. The formation of hot-spots is avoided by controlling the fluidized bed so that it always contains polymer particles (i.e. newly formed particles and growing polymer particles).

In the fluidized bed process the monomer stream that passes through the bed but is not reacted moves upwardly in the reactor toward what is described as a disengagement zone, or portion of the reactor that expands outwardly and upwardly resulting in a reduction of gas and particle velocity. As a result, most of the particles fall back into the bed. Unreacted monomer is taken off as a recycle gas and fed into the bottom of the reactor along with gas feed.

The catalyst is fed seperately into the reactor and the rate of catalyst addition controls the polymerization rate as well as the amount of heat that is generated in the fluidized bed. The reaction can therefore be controlled by analyzing the temperature of the gas stream exiting the reactor and adjusting the rate of catalyst addition. The typical polymerization catalyst employed comprises chromium oxide containing titanium and fluoride.

The process generally runs at about 85° to about 95° C. and at a pressure from about 250 to about 325 psi.

One of the advantages of employing a gas-phase reaction process is that the product obtained does not have to be separated from any solvent such as is required in a slurry process.

Accordingly, it is an object of the present invention to overcome these and other difficulties and to achieve the various objectives of the prior art.

It is a further object of the present invention to provide a method for deactivating a Ziegler-Natta or a transition element oxide catalyst.

It is also an object of the present invention to provide a method for deactivating a Ziegler-Natta or a transition element oxide olefin polymerization catalyst with a non-volatile deactivator.

It is a further object of the present invention to provide a method for deactivating a Ziegler-Natta or a transition element oxide catalyst with a deactivator that would not be recycled to an olefin polymerization process with the recycle of unreacted olefin monomer.

It is also an object of the present invention to provide a deactivator for a Ziegler-Natta or transition element oxide olefin polymerization catalyst that does not have to be removed from the polymer obtained.

It is also an object of the present invention to provide a deactivator for a Ziegler-Natta or transition element oxide catalyst that is not an inorganic material and that may remain in the polymer obtained.

It is also an object of the invention to control hot spots in gas-phase olefin polymerization processes.

These and other objects have been achieved according to the present invention in which a method is provided for deactivating or controlling the activity of a Ziegler-Natta transition element olefin polymerization catalyst or transition element oxide olefin polymerization catalyst comprising contacting the catalyst with a deactivating polymer of an unsaturated polar organic compound i.e., a polymer comprising a homopolymer of an unsaturated polar organic compound or a copolymer of an alpha-olefin and an unsaturated polar organic compound.

In one embodiment, a method is provided for the preparation of polyolefins at elevated pressures by polymerizing alpha-olefins in the presence of a Ziegler-Natta catalyst based on a transition element or transition element oxide catalyst whereby the polyolefin contains the catalyst in an active state. This catalyst is deactivated or catalyst activity is controlled by contacting the polyolefin containing the catalyst in the active state with a deactivating polymer after the alpha- olefin has been polymerized. The deactivating polymer comprises a polymer of an unsaturated organic polar compound i.e., a polymer comprising a homopolymer of an unsaturated polar organic compound or a copolymer of an alpha-olefin and an unsaturated polar organic compound.

The deactivating polymer of the present invention is effective for the deactivation of Ziegler-Natta or transition element oxide catalysts which are employed in the polymerization of alpha-olefins. Ziegler-Natta catalysts are well known in the art and generally comprise electro-positive transition metals of Groups IV–VIII of the Periodic Table of the Elements and especially Ti, V, Cr and Zr. These transition elements are at a level of oxidation lower than the maximum. In one embodiment they are employed in combination with a compound containing carbon or hydrogen linked to a metal from Groups I-III of the Periodic Table of the Elements in addition to compounds based on the non-transition elements from Group IVA of the periodic table of the elements such as silicon (e.g., $SiCl_4$) and Group IIA elements from the Periodic Table of the Elements e.g., magnesium. Catalysts of this type may be supported or unsupported, magnesium chloride comprising one of the support materials that may be employed, although other support materials may be used such as alumina, silica, zirconia and the like.

In one embodiment of the invention, the Ziegler-Natta catalyst employed for olefin polymerization comprises about 0.35 moles $Ti(OBu)_4$(Bu=butyl), about 0.253 moles Mg and about 0.0458 moles $MgCl_2$ as a support in combination with about 1.0 moles $SiCl_4$ (a chlorinating agent).

The deactivating polymer will also deactivate other similar olefin polymerization catalysts such as the oxides of the transition elements, e.g. V, Mo or W on alumina or another inert metal oxide and which are activated by reduction with hydrogen. Another example of olefin polymerization catalysts that may be deactivated according to the invention are the Phillips type, e.g. chromic oxide on silica-aluminum activated by oxidation with air at 500° C. Polymerization is carried out in suspension or hydrocarbon solvents at 50°–200° C. and from atmospheric to about 600 psi pressure and more employing these catalysts.

The activity of the above catalyst is increased by the use of a co-catalyst such as aluminum alkyl, e.g., triethyl aluminum, tripropyl aluminum and the like. In the case of chromium catalyst, alkyl boranes such as triethyl borane, triisopropyl borane and the like or boron hydrides are more likely to be used as a co-catalyst.

The deactivating polymer of the present invention is employed to deactivate Ziegler-Natta or transition element oxide catalysts that are utilized in the high pressure polymerization of olefins such as for example the preparation of linear low density (LLD) poly-olefins. These polymers are prepared at pressures from about 10,000 psig to about 30,000 psig and especially from about 15,000 psig to about 25,000 psig. The temperature of the polymerization is from about 150° C. to about 270° C. and especially from about 200° C. to about 240° C. The olefin polymerization or the preparation of polyolefins according to the present invention includes the preparation of homopolymers or copolymers, based on alpha-olefins having from 2 to about 4 carbon atoms. The copolymers in this instance contain two or more different alpha-olefins. The copolymers prepared according to the present invention especially comprise the LLD type of copolymers containing high molecular weight alpha-olefins such as those alpha-olefins containing from about 5 to about 12 carbon atoms in addition to one or more of the other aforesaid alpha-olefins such as ethylene and the like.

The higher molecular weight alpha-olefins (e.g. those having from 5 to about 12 carbon atoms) are introduced into the polymer to increase branching along the polymer chain and thereby reduce density. LLD polymers are preferred in applications where the polymer is processed through a screw extruder for film formation, injection molding and the like since less energy is required than that for linear high density polyolefins processed through such apparatus.

The olefin polymerization or polymerization of alpha-olefins according to the present invention may be either a batch, continuous or semicontinuous process. The copolymers that are formed in this respect may be either random, block or graft copolymers.

The deactivating polymer is employed in the high pressure process by combining it with a polyolefin containing the aforesaid Ziegler-Natta or transition element oxide catalyst which is in an active state where the polyolefin has been polymerized either by a batch, continuous or semicontinuous method. Where the catalytic polymerization is conducted in a continuous or semicontinuous process, the polyolefin obtained is drawn off from the reactor through a conduit into a let-down tank so that unreacted monomer and other components employed in the polymerization, if any (e.g., solvent), can be stripped from the polymer and the product can be brought to ambient pressures and temperatures. The deactivating polymer may be injected into either the reactor, the conduit leading into the let-down tank or the let-down tank itself. The polyolefin containing the Ziegler-Natta or transition element oxide catalyst in an active state (e.g., LLD polymer) generally exits the reactor at about 240° C. and the deactivating polymer may be injected into the hot polymer stream passing through the conduit into the let-down tank. The deactivating polymer may be preheated in order to improve mixing with the hot polymer stream. Additionally, the deactivating polymer may be blended with a polyolefin obtained from the Ziegler-Natta or transition element oxide catalyst polymerization in which the catalyst has been deactivated. This blending assures better mixing of the polyolefin containing active catalyst and deactivating polymer. The blend may then be injected into the polymer that is produced containing active Ziegler-Natta or transition element oxide catalyst, the blend optionally being preheated to further assure good mixing.

The olefin component of the deactivating polymer in one embodiment may be substantially the same as the olefin component of the polymer containing the active Ziegler-Natta or transition element oxide catalyst that has to be deactivated.

Additionally, the deactivating polymer when used in the high pressure process can be injected into the polymer containing active Ziegler-Natta or transition element oxide catalyst by dissolving the deactivating polymer in a solvent such as octane, decane, decalin and equivalent non-polar solvents which will not deactivate the catalyst; however, utilization of a solvent economically would require that the solvent be subsequently recovered and recycled which would make the process somewhat more costly than the direct injection of the deactivating polymer. Any solvent may be used in this respect which will not deactivate the Ziegler-Natta or transition element oxide catalyst. Solvents such as these are preferred since it minimizes the risk of deactivating the catalyst in the main reactor when unreacted olefin monomer is recycled to the main reactor with traces of solvent.

The catalyst used in the gas phase polymerization processes may be combined with the deactivating polymers in sufficient amount to control catalyst activity and reduce hot-spots. This may be effected by mixing a finely divided deactivation polymer with the catalyst employed in the gas phase polymerization process or by dissolving the deactivating polymer in a solvent such as hexane and the like, combining it with the gas phase polymerization catalyst followed by removing the solvent from the catalyst that has been treated. Any drying process known in the art such as spray drying or evaporative drying employing a vacuum or drying at elevated temperatures or any combination of these conditions may be employed to effect solvent removal. Agglomeration of catalyst particles may be avoided by using dilute solutions of the deactivating polymer e.g. anywhere from about 1% to about 20% and especially from about 2% to about 10% of polymer in solvent. In addition to or as an alternative to combining the deactivating polymer with the gas phase polymerization catalyst, the deactivating polymer may be directly injected into the gas phase polymerization reactor during the polymerization reaction or intermittently in order to control the formation of hot-spots.

It should be noted in this regard that the term gas-phase polymerization is a term that does not fully describe the process since the polymerization occurs on or within particles of polyolefins such as polyethylene contained in the polymerization vessel. In the Union Carbide and Naphtachimie processes, the reaction is started by charging the reactor and forming a fluidized bed of polyolefins such as polyethylene particles. This is done before the gas flow is started. After this bed of preformed polyethylene particles is converted into a fluidized bed by passing olefin gas such as ethylene gas through it, the catalyst is introduced and gradually a new fluidized bed is formed that displaces the old one, the new fluidized bed comprising a mixture of growing polymer particles and newly formed particles. Start up of the Standard Oil process is effected in substantially the same way; however, a fluidized bed is not used.

Since polymer growth occurs within the particles of polyolefin, substituting the deactivating polymer of the present invention for the polymer particles produced comprises a novel means not only of controlling the rate of reaction of the olefin but also eliminating hot-spots in the gas-phase process.

The deactivating polymers of the present invention comprise homopolymers based on an unsaturated polar organic compound and copolymers based on two or more monomers one of which is an alpha-olefin and the other of which is an unsaturated polar organic compound. The alpha-olefins employed in this aspect of the invention may contain anywhere from 2 to about 12 carbon atoms and especially 2 to about 4 carbon atoms and various mixtures thereof. Ethylene is an especially preferred alpha-olefin in this regard.

The unsaturated polar organic compound preferably comprises an unsaturated ester such as a vinyl ester or an acrylic ester and especially a vinyl ester.

These and other unsaturated polar organic compounds include:

a. Vinyl esters of carboxylic acids such as vinyl formate, vinyl acetate, vinyl propionate, vinyl butyrate, vinyl benzoate, and the like.

b. Mono-olefinically unsaturated acrylic or dicarboxylic acid esters such as the methyl, ethyl, propyl, isopropyl, butyl, t-butyl and iso-butyl esters, for example, alkylacrylates and methacrylates such as methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, n-octyl acrylate, n-decyl acrylate, hydroxyethyl acrylate, hydroxypropyl acrylate, ethyl methacrylate, n-butyl methacrylate, cyanoethyl acrylate, cyanobutyl acrylate, diethylaminoethyl acrylate, esters of dicarboxylic acids such as monoisopropyl maleate, mono-2-ethylhexyl maleate, mono-n-butyl fumarate, dibutyl maleate, diethyl maleate and diethyl fumarate and the like.

c. Amides of acrylic acid such as acrylamide, N-methyl acrylamide, N-phenyl acrylamide, N,N-dimethyl acrylamide, N,N-dibutylacrylamide and the like.

d. Mono-olefinically unsaturated carboxylic acids, for example, acrylic acid, methacrylic acid, crotonic acid, cinnamic acid, alpha-chloroacrylic acid, atropic acid, alpha-fluoroacrylic acid, fumaric acid, maleic acid, itaconic acid and the like.

e. Vinyl ethers such as vinyl isobutyl ether, vinyl decyl ether, and the like.

These materials are selected so that the polymers made therefrom contain substantially intramolecular bonds and are substantially free of three dimensional cross-linking.

The unsaturated polar organic compound may be present in the deactivating polymer in an amount from about 5 mole % to about 100 mole %, especially from about 10 mole % to about 50 mole % and preferably from about 25 mole % to about 45 mole % of the deactivating polymer the balance being the aforementioned olefin or olefins. The deactivating polymer may be either a random, block or graft polymer and is made according to methods that are well known in the polymerization art. In the process for deactivating the Ziegler-Natta or transition element oxide catalyst as described herein, the deactivating polymer is employed in an amount such that the molar ratio of the polar organic component of the deactivating polymer to the sum of the transition element component of the catalyst plus the co-catalyst is from about 0.1 to about 6 and preferably from about 2 to about 4.

One of the preferred deactivating polymers comprises a copolymer of ethylene and vinyl acetate where the vinyl acetate is present in an amount from about 25% to about 60% on a weight basis and the balance ethylene.

The following examples are illustrative.

EXAMPLES 1-10

A bench scale reactor was used to evaluate an ethylene vinyl acetate (EVA) copolymer for the deactivation of a Ziegler-Natta catalyst. The reactor comprised a 3850 ml stainless steel autoclave equipped with a stirrer and a heating jacket.

The catalyst employed comprised TMMG encapsulated catalyst prepared by adding 2.78 kg magnesium metal, 4.21 kg $MgCl_2.6H_2O$ and 54.42 kg titanium tetrabutylate to 54.42 kg octane. The temperature is increased to 125°–126° C. while stirring and held at this temperature for 4 hrs, after which the mixture is cooled to 38° C. and set aside. A second batch of this mixture is prepared in the same way and combined with the first and with the temperature held at 10° C.–13° C., 163.26 kg of silicon tetrachloride added and the mixture agitated for 8 hrs. The stirring was stopped and the catalyst allowed to settle after which it was washed 6 times with 567.75 liters octane for each wash. After washing, 77.55 kg of 25% triethyl aluminum in octane solution was added followed by an addition of 14.51 kg of hexene-1.

The mixture was then stirred for 2 hrs after which 321.73 liters of octane was added to complete the catalyst preparation.

A random EVA copolymer containing 38.5 percent by weight of vinyl acetate and having a viscosity of 136 cp, measured at 140° C. was prepared. In order to ensure that no unreacted vinyl acetate monomer was present, an octane solution of the above EVA copolymer (3.2 g EVA/40 ml of octane) was purged with nitrogen for one hour at 40° C. prior to use. Ten polymerization reactions were conducted by charging the reactor with 1200 ml isobutane, 117 psig ethylene, 190 ml butene-1, 55 psig hydrogen and the catalyst and in some instances the solution of EVA copolymer as described above. The reaction temperature was maintained substantially at 76.7° C., the pressure at 352 psig and the hydrogen pressure at 55 psig while maintaining continuous agitation for the polymerization which was carried out over a 60 minute period. Additional butene-1, at a rate of 7.6 ml/min, and ethylene, sufficient to maintain a constant pressure of 352 psig, were added during the polymerization reaction.

The reaction was conducted for a period of one hour in each example after which the contents of the reactor were dumped and analyzed.

The results obtained are listed below in Table I.

TABLE I

| | Catalyst | | | EVA | VA/ | Productivity | Powder Resin Properties | | |
|---|---|---|---|---|---|---|---|---|---|
| Ex | mg Ti | mmol Ti | Al/Ti | (mmol VA) | Al + Ti | (g PE/g Ti-hr) | MI | MIR | Density |
| 1 | 1.5 | 0.0312 | 13 | — | — | Runaway | — | — | — |
| 2 | 0.75 | 0.0156 | 13 | — | — | 909,335 | 1.68 | 32.1 | 0.9197 |
| 3 | 0.45 | 0.0094 | 13 | — | — | 1,104,445 | 1.93 | 31.1 | 0.9200 |
| 4 | 0.45 | 0.0094 | 13 | 0.132 | 1.0 | 413,335 | 1.08 | 30.7 | 0.9223 |
| 5 | 0.45 | 0.0094 | 13 | 0.264 | 2.0 | 188,885 | 0.80 | 28.0 | 0.9234 |
| 6 | 0.45 | 0.0094 | 13 | 0.330 | 2.5 | — | — | — | — |
| 7 | 0.45 | 0.0094 | 13 | — | — | 771,110 | 1.39 | 32.0 | 0.9205 |
| 8 | 1.5 | 0.0312 | 13 | 1.082 | 2.5 | — | — | — | — |
| 9 | 0.45 | 0.0094 | 13 | — | — | 271,110 | 1.00 | 31.9 | 0.9188 |
| 10 | 0.45 | 0.0094 | 13 | — | — | 762,220 | 1.24 | 32.9 | 0.9138 |

The aluminum reported in Table I above is based on aluminum as triethyl aluminum.
(1) mole ratio of vinyl acetate (VA) from EVA co-polymer to Al + Ti of catalyst.

The above data indicate that the addition of an EVA copolymer resulted in a decrease in catalyst activity. Further increases produced total deactivation at 2.5:1 VA:Al+Ti. This ratio also prevented polymerization at Al and Ti levels which normally would result in runaway polymerization. Comparisons of melt index and density for runs with and without EVA show that EVA reduces both hydrogen sensitivity and butene incorporation.

EXAMPLES 11–16

The method of Examples 1–10 was employed using a prepolymerized hexene-1 titanium compound catalyst with triethyl aluminum as a co-catalyst in the evaluation of EVA copolymers as catalyst deactivators. The catalyst was prepared in the same manner as described for Examples 1–10.

The same apparatus and procedure as used in Examples 1–10 were employed; however, the polymerization temperature employed was 87.8° C. The results obtained are tabulated below in Table II.

TABLE II

| Ex | mg Ti | mmol Ti | Al/Ti (molar) | EVA (mmol VA) | VA/ Al + Ti | Productivity g PE/g Ti/hr | Polymer Density |
|---|---|---|---|---|---|---|---|
| 11 | 1.5 | 0.0312 | 13 | — | — | runaway reaction | — |
| 12 | 0.45 | 0.0094 | 13 | — | — | 1,104,445 | 0.9200 |
| 13 | 0.45 | 0.0094 | 13 | 0.132 | 1.0 | 413,335 | 0.9223 |
| 14 | 0.45 | 0.0094 | 13 | 0.264 | 2.0 | 188,885 | 0.9234 |
| 15 | 0.45 | 0.0094 | 13 | 0.330 | 2.5 | no reaction | — |
| 16 | 1.5 | 0.0312 | 13 | 1.082 | 2.5 | no reaction | — |

From the above data it is apparent that the activity of the catalyst for polymerization is reduced with increasing concentrations of EVA copolymer in the reactor. When the EVA concentration was such that the molar ratio of vinyl acetate in the copolymer to the sum of aluminum (from triethyl aluminum) and titanium in the catalyst was 2.5/1, the catalyst was deactivated as indicated by "no reaction." At lesser ratios, the activity of the catalyst was reduced.

Although the invention has been described by reference to some embodiments, it is not intended that the novel method for deactivating olefin polymerization catalysts are to be limited thereby but that modifications thereof are intended to be included as falling withing the spirit and broad scope of the foregoing disclosure and the following claims.

What is claimed is:

1. A method comprising deactivating an olefin polymerization catalyst selected from the group consisting of Ziegler-Natta transition element catalysts and catalysts based on transition metal oxides by contacting said cataylst with a copolymer consisting of an alpha-olefin having from 2 to about 12 carbon atoms and an unsaturated ester of a carboxylic acid, said deactivating copolymer present in an amount such that the molar ratio of the unsaturated ester thereof to the sum of the transistion element component of the polymerization catalyst and a cocatalyst for said transistion element catalyst is in the range of between about 0.1 and about 6.

2. The method of claim 1 where said unsaturated ester is selected from a member of the group consisting of vinyl esters and acrylic esters.

3. The method of claim 2 where said alpha-olefin contains from 2 to about 4 carbon atoms.

4. The method of claim 3 where said unsaturated ester comprises a vinyl ester.

5. The method of claim 4 where said alpha-olefin comprises ethylene.

6. The method of claim 5 where said vinyl ester comprises vinyl acetate.

7. The method of claim 1 where said deactivating copolymer comrpises from about 5 mole % to about 60 mole % of said unsaturated ester.

8. The method of claim 1 where said catalyst comprises a Ziegler-Natta catalyst based on a transition element selected from a member of the group consisting of Ti, V, Cr and Zr.

9. The method of claim 1 where said catalyst comprises an oxide of a transition element selected from a member of the group consisting of V, Cr, Mo and W.

10. The method of claim 8 where said unsaturated ester comprises a vinyl ester.

11. The method of claim 10 where said vinyl ester comprises vinyl acetate.

12. The method of claim 11 where said transition element comprises Ti.

* * * * *